United States Patent
Gradu

(10) Patent No.: US 6,712,728 B2
(45) Date of Patent: *Mar. 30, 2004

(54) TRANSFER CASE WITH ENHANCED TORQUE BIAS CAPABILITY

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/059,450

(22) Filed: Jan. 29, 2002

(65) Prior Publication Data

US 2003/0144109 A1 Jul. 31, 2003

(51) Int. Cl.$^7$ .................................. B60K 17/346
(52) U.S. Cl. ............................ 475/152; 475/149
(58) Field of Search ................... 475/149, 151, 475/152, 204, 329; 180/247, 248, 249

(56) References Cited

U.S. PATENT DOCUMENTS

| | | |
|---|---|---|
| 2,709,928 A | 6/1955 | Gordon |
| 4,037,694 A | 7/1977 | Keese |
| 4,417,641 A | 11/1983 | Kageyama |
| 4,606,446 A | 8/1986 | Watanabe |
| 4,656,889 A | 4/1987 | Mueller |
| 4,803,628 A | 2/1989 | Hayashi et al. |
| 4,860,612 A | 8/1989 | Dick et al. |
| 4,866,624 A | 9/1989 | Nishikawa et al. |
| 4,871,049 A | 10/1989 | Okita |
| 5,226,860 A * | 7/1993 | Baxter et al. ........... 475/206 |
| 5,469,950 A | 11/1995 | Lundström et al. |
| 5,497,333 A | 3/1996 | Sasaki |
| 5,545,103 A | 8/1996 | Gustin |
| 5,595,214 A | 1/1997 | Shaffer et al. |
| 5,713,444 A | 2/1998 | Schroeder |
| 5,733,222 A | 3/1998 | Kawahara et al. |
| 5,890,983 A | 4/1999 | Kawahara et al. |
| 5,941,788 A | 8/1999 | Shaffer et al. |
| 5,979,631 A | 11/1999 | Lundström |
| 5,980,415 A | 11/1999 | Showalter |
| 6,098,770 A | 8/2000 | Isley, Jr. |
| 6,142,905 A | 11/2000 | Brown et al. |
| 6,158,303 A | 12/2000 | Shiraishi et al. |

FOREIGN PATENT DOCUMENTS

| | | |
|---|---|---|
| EP | 0773130 A2 | 5/1997 |

* cited by examiner

*Primary Examiner*—Ankur Parekh
(74) *Attorney, Agent, or Firm*—Polster, Lieder, Woodruff & Lucchesi, L.C.

(57) ABSTRACT

A transfer case, which may be used to distribute the torque selectively between the primary and secondary driving wheels of an automotive vehicle, includes an input element and two output elements located along a common axis. It also includes a magnetic particle clutch and a planetary gear set which are both organized by about the same axis. The clutch and planetary set are connected together such that they provide a direct path through which torque is transferred from the input element to one of the output elements without slippage. The arrangement further provides a slip path through which torque is transferred from the input element to the other output element with slippage, and this path has two segments, one through the planetary set and the other through the clutch and planetary set. The clutch path accommodates slippage and the proportion of torque transferred through the slip path depends solely on the electric current conducted through the clutch.

19 Claims, 4 Drawing Sheets

TRANSFER CASE WITH ENHANCED TORQUE BIAS CAPABILITY

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

This invention relates in general to the distribution of torque and more particularly to a transfer case for splitting torque so that it can be distributed to two outputs.

Most four wheel automotive vehicles, such as sedans, station wagons and vans, operate with the engine torque delivered to only one set of wheels on such vehicles. In some vehicles that set is the rear wheels, but in most vehicles of current manufacture it is the front wheels. However, some manufacturers now offer all-wheel-drive vehicles, and the typical vehicle of this type operates with the engine torque distributed to all four of its wheels—all the time. To be sure, many light trucks and sport utility vehicles have four-wheel drive, but in a vehicle of this type only two wheels—usually the rear—normally propel the vehicle, while the remaining two may be called upon to also propel the vehicle if the need arises. This usually requires the driver to operate a switch or manipulate a lever to engage the wheels that are otherwise disconnected from the engine. In contrast, in an all-wheel-drive vehicle, the engine delivers torque to all four wheels basically all the time; no controls exist for disconnecting one or the other of the two sets of wheels from the engine.

A variety of mechanisms exist for distributing engine torque between the front and rear wheels of all-wheel-drive vehicles. Some rely simply on viscous coupling between the front and rear wheels. Others utilize clutches with a variety of mechanisms for operating the clutches. These mechanisms may have the capacity to vary the torque between the front and rear wheels so as to transfer more torque to wheels having the better traction. Indeed, some of these come equipped with highly sophisticated control systems which sense not only slippage between the front and rear wheels, but other operating conditions such as throttle position, gear lever position and engine speed, as well, all to tailor the torque distribution such that it provides the best traction for the driving conditions.

But the typical clutch has plates which accommodate a slight measure of slippage and are urged together with a greater bias when the primary wheels lose traction and begin to slip. However, the torque transferred through the clutch depends on several variables, including the temperature of the clutch, the relative speed between the plates, as well as the force or pressure with which the clutch plates are compressed against each other. These variables make such clutches difficult to control and indeed require complex electronics to effect control.

SUMMARY OF THE INVENTION

The present invention resides in a transfer case through which torque is transferred between an input element and two output elements. The transfer case contains a clutch and a planetary gear set and splits the torque into a direct path and an indirect path, with the indirect path passing through both the clutch and the planetary set.

DETAILED DESCRIPTION OF THE INVENTION

Figure 1:
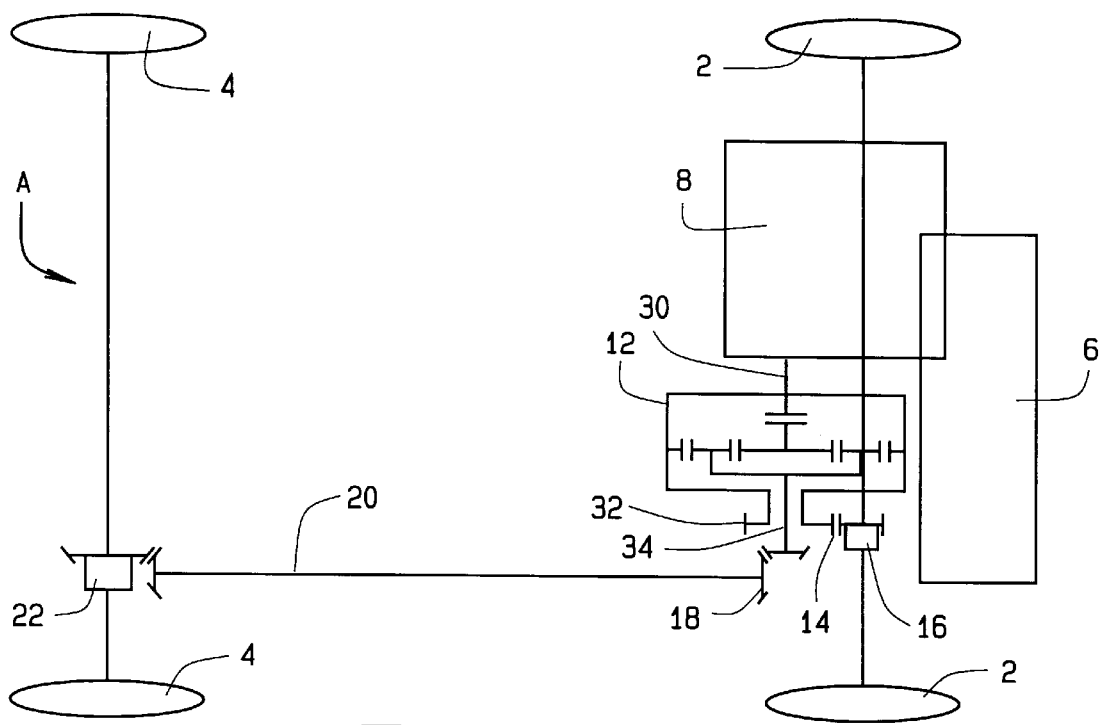
FIG. 1 is a schematic view of an automotive vehicle, having a transversely mounted motor, coupled with a transfer case constructed in accordance with and embodying the present invention.

Referring now to the drawings, an automotive vehicle A (FIG. 1), such as a passenger, or a sports utility vehicle, or a van, or even a light truck, has four wheels arranged in two sets, that is to say, two primary driving wheels 2 and two secondary driving wheels 4. The primary driving wheels 2 are located at the front of the vehicle A basically along a common transverse axis, whereas the secondary driving wheels are located at the rear of the vehicle A basically along another common transverse axis.

The vehicle A also includes a motor 6 which is typically mounted transversely and is coupled to a transmission 8 which may be of the automatic or manual variety. The motor 6 and transmission 8 constitute a power unit which supplies the torque required to turn the wheels 2 and 4 and propel the vehicle A. Indeed, the transmission 8 delivers the torque to a transfer case 12 which splits the torque, selectively apportioning some to the torque to the front driving wheels 2 and the rest to the rear driving wheels 4. Actually, the transfer case 12 is coupled to the front wheels 2 through a helical gear set 14 and through a differential 16 which is located between the two front wheels 2. The transfer case 12 is coupled to the rear wheels 4 through a bevel or hypoid gear set 18, a drive shaft 20 that extends longitudinally in the vehicle A, and a rear differential 22 located between the two rear wheels 4.

Figure 2:
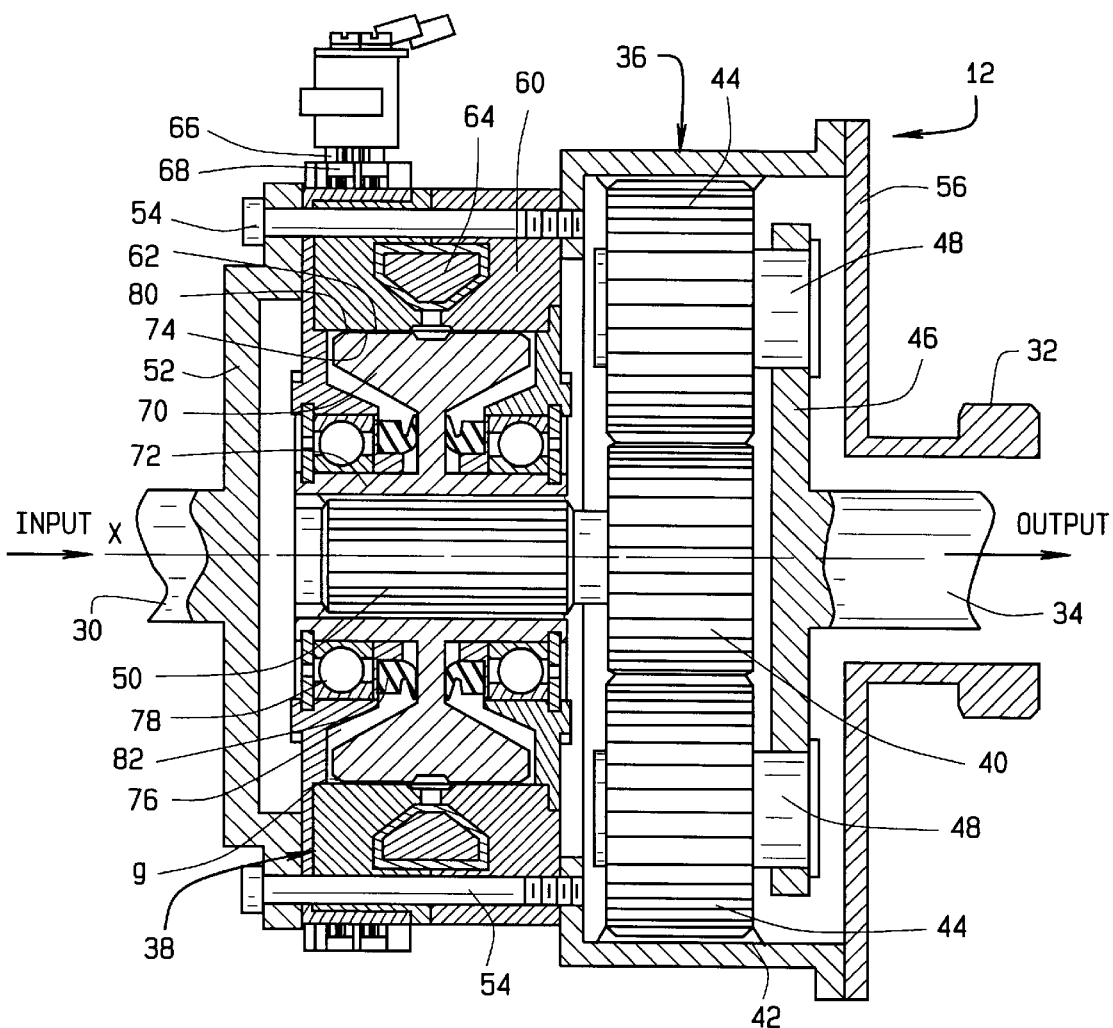
FIG. 2 is a longitudinal sectional view of the transfer case.
Figure 3:
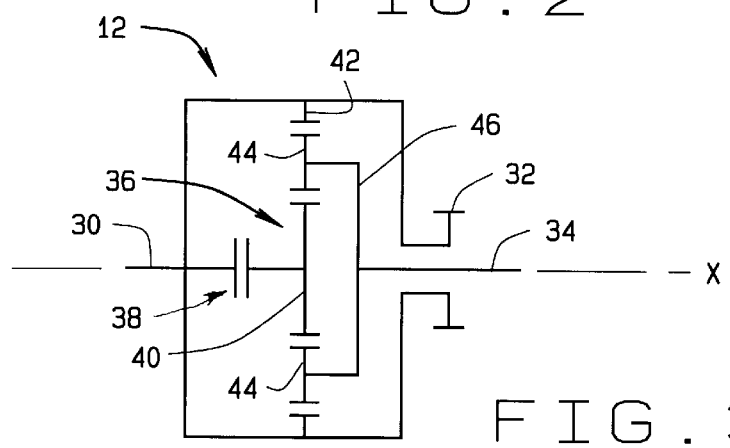
FIG. 3 is a kinematic diagram of the transfer case.

The transfer case 12 has (FIG. 2) an input element in the form of a shaft 30 and two output elements, one in the form of a helical gear 32, which forms part of the gear set 14, and the other in the form of a shaft 34. It also includes a planetary gear set 36 between the input shaft 30 and both the output gear 32 and output shaft 34. In addition, the transfer case 12 has a magnetic particle clutch 38 between the input shaft 30 and the output shaft 34. Torque transfers from the input shaft 30 to the output gear 32 without slippage, that is to say, the transfer is direct. Torque transfers from the input shaft 30 to the output shaft 34 through the clutch 38 and also through the planetary set 36, and this transfer under some operating conditions is accompanied by slippage. The former constitutes a direct path and the latter an indirect path. The input shaft 30, output gear 32 and shaft 34, the planetary set 36 and the clutch 38 are all organized about a common axis X.

Considering the planetary set 36, it includes (FIG. 2) a sun gear 40, a ring gear 42, and several planet gears 44 located between the sun gear 40 and ring gear 42 and engaged with both. In addition, the planetary set 36 includes a carrier 46 having spindles 48 about which the planetary gears 44 rotate. The sun gear 40 has a stub shaft 50 projecting axially from it.

The ring gear 42 is connected rigidly to the input shaft 30 through a drive flange 52 on the end of the input shaft 30 and connectors 54 which extend from the flange 52 through the clutch 38 and are anchored in the ring gear 42 at one end of that gear. The connectors 54 may take the form of machine screws. The output gear 14 is mounted on another drive flange 56 which is attached to the other end of the ring gear 42. Thus a direct connection exists between the input shaft 30 and the output spur gear 32, and the two rotate in unison and at the same angular velocity.

Mechanically, the magnetic particle clutch 38 lies between the connectors 54 on the drive flange 52 and the stub shaft 50 on the sun gear 40. It thus transfers torque between the input shaft 30 and the sun gear 40, which is the element of the planetary set 36 that experiences the lowest torque.

The magnetic particle clutch 38 includes (FIG. 2) an electromagnet 60 which is captured between the flange 52 on the input shaft 30 and the ring gear 42 of the planetary gear set 36 and is secured to both with the connectors 54. As a consequence, the input shaft 30, the ring gear 46, and the electromagnet 60 all rotate as a unit about the axis X. The electromagnet 60 has a cylindrical surface 62 that is presented inwardly toward the axis X and further contains a coil 64 to which electrical current is supplied through a set of stationary brushes 66 and a set of slip rings 68 which rotate with the electromagnet 60.

In addition to the electromagnet 60 and its coil 64, the clutch 38 has an armature 70 which is located within the electromagnet 60 and includes a sleeve 72 that fits over the stub shaft 50 of the planetary gear set 36, it being coupled to the stub shaft 50 through mating splines. The armature 70 also has a cylindrical surface 74 which is presented outwardly away from the axis X and toward the cylindrical surface 62 on the electromagnet 60, there being a small gap g between the two cylindrical surfaces 62 and 74. Opening out of the ends of the armature 70 are annular recesses 76 which contain antifriction bearings 78 that support the electromagnet 60 on the armature 70.

The bearings 78 fit around the sleeve 72 of the armature 70 and the electromagnet 60 in turn fits around the bearings 78. The arrangement is such that the input shaft 30, the ring gear 42, and the electromagnet 60 rotate as a single unit about the axis X, and likewise the stub shaft 50, the sun gear 40 and armature 70 rotate as another unit about the axis X. The two units may rotate at slightly different angular velocities, or they may rotate at the same angular velocity. When the clutch 38 engages, the stub shaft 50 and the sun gear 40 provide the required reaction torque to make the two units rotate together.

Figure 4:
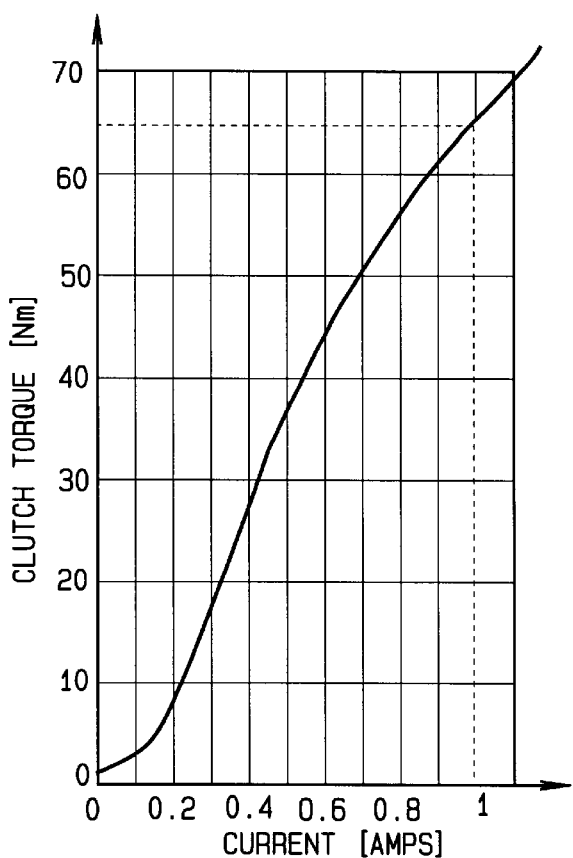
FIG. 4 is a graph showing the relationship between torque transferred by the clutch of the transfer case and current conducted in the coil of the clutch.

The clutch 38 contains fine particles 80 of a ferrous substance that can be magnetized, and they exist in the gap g. The bearings 78 are isolated from the magnetic particles 80 by seals 82. When the coil 64 is energized with electrical current, the particles 80 become magnetized and couple the electromagnet 60 with the armature 70 such that torque can be transferred between the two, yet slippage between the two can occur as well. The amount of torque transferred depends solely on the amount of current conducted by the coil 64, and is totally independent of the magnitude of the slippage in or the temperature of the clutch. Indeed, the relationship between torque and current, when plotted on Cartesian coordinates, closely approaches being linear (FIG. 4). The microprocessor, to which the sensors feed signals reflecting the driving conditions of the vehicle A, controls the amount of current supplied to the coil 64 of the clutch 38. However, the amount of current may also be controlled by a manually-operated device such as a rheostat.

In the operation of the vehicle A, the motor 6 generates torque, and that torque is transferred through the transmission 8 which has the capacity to alter the torque, so that the torque delivered by the transmission 8 may be different from that delivered by the motor 6. The torque delivered by the transmission 8 is applied to the input shaft 30 of the transfer case 12. Within the case 12 the torque splits, with some of it being delivered to the output gear 32 through the direct path and the rest of it to the output shaft 34 through the indirect path. The apportionment of the torque between the gear 32 and shaft 34 depends solely on the current conducted through the coil 64 of the magnetic particle clutch 38.

More specifically, the torque delivered to the output gear 32 passes through the direct path of the transfer case 12, that is to say from the input shaft 30 through the drive flange 52 to the connectors 54 to the ring gear 42 of the planetary set 36, and thence through the other drive flange 56 to the output gear 32. Since the output gear 32 is part of the gear set 14 which drives the front wheels 2 through the front differential 16, the torque in the direct path is transferred to the front wheels 2. The connection is direct and no slippage occurs. The front differential 16, of course, enables one of the front wheels 2 to rotate at a velocity different than the other front wheel 2, but the transfer of torque through the differential 16 dos not involve slippage.

The torque delivered to the output shaft 34 passes through the indirect path which has two segments. In one, the mechanical segment, the torque transfers from the input shaft 30 to the ring gear 42 through the drive flange 52 and the connectors 54, to the planet gears 44 of the planetary set 36 and thence through the carrier 46 to the output shaft 34. The other segment, the clutch segment, splits from the mechanical segment at the connectors 54 and transfers torque through the clutch 38, that is from the electromagnet 60 through the magnetic particles 80 in the gap g to the armature 70, and from there to the sun gear 40 through the stub shaft 50. The sun gear 40, being engaged with the planet gears 44, also drives them, and here the torque in the clutch segment of the indirect path recombines with the torque in the mechanical segment of the indirect path to drive the carrier 46 which in turn transfers the torque of the indirect path to the output shaft 34. Since the output shaft 34 is connected to the rear wheels 4 through the gear set 18, the drive shaft 20 and the rear differential 22, the torque in the indirect path is delivered to the rear wheels 4, and under some operating conditions may be accompanied by slippage in the transfer case 12. That slippage will occur within the clutch 38, and when it does, the sun gear 40 of the planetary set 36 rotates at a slightly different velocity than the ring gear 42. As a consequence, the carrier 46 rotates at a velocity somewhere between the velocities of the sun and ring gears 40 and 42. Indeed, in some cases the size of the rear wheels 4 in comparison to the front wheels 2 or the speed ratio of the bevel gears 18 or even the speed ratio of the rear differential 22 is such that slippage is induced, that is to say, one or more of the foregoing cause the output shaft 34 to rotate at a velocity different from the velocity at which the output gear 32 and input shaft 30 rotate. Typically, the input shaft 30 rotates slightly faster than the output shaft 34, but obviously at the same velocity as the output gear 32. Irrespective of the magnitude of the slippage, the torque transferred through the clutch 38 remains the same as long as the current in the coil 64 for the electromagnet 60 of the clutch 38 does not vary and, of course, with no variance in torque at the input shaft 30. Indeed, the transfer of torque through the clutch segment of the indirect path depends solely on the amount of current conducted by the coil 60. The same holds true with regard to the amount of torque transferred through the slip path—it is dependent solely on the amount of current conducted through the coil 64 of the clutch 38.

Figure 5:
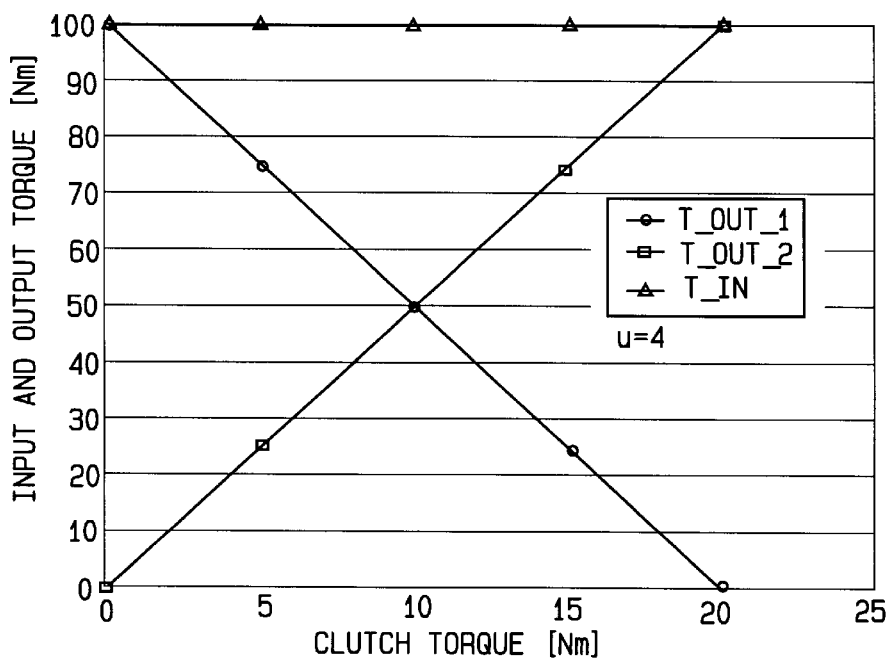
FIG. 5 is a graph showing the relationship of input torque and output torque to clutch torque for a transfer case in which the planetary set has a ratio of 4.

The torque delivered to the transfer case at the input shaft 30 is apportioned between the output gear 32 and the output shaft 34 in response solely to the current conducted through coil 64. Variables, such as relative speed between the output gear 32 and output shaft 34 or the temperature of the clutch 38, do not affect the apportionment of torque between the gear 32 and the shaft 34 and likewise between the front wheels 2 and rear wheels 4. Yet the torque transferred through the clutch 38 represents only a small proportion of the torque transferred through the indirect path. In other words, insofar as the torque delivered to the output shaft 34 and rear wheels 4 is concerned, only a small amount goes through the clutch segment of the indirect path, and a much larger amount goes through the mechanical segment. The relationship is demonstrated by a plot on Cartesian coordinates of the output torque at the gear 32 and output shaft 34 against the torque transferred through the clutch 38 for a planetary set 36 in which ratio u between the teeth on the ring gear 42 and the teeth on the sun gear 40 is 4 (FIG. 5). For example, when the torque at the input shaft 30 amounts to 100 Nm and the torque in the clutch 38, that is the torque passing through the clutch segment of the indirect path, is 5 Nm, the torque delivered to the output gear 32 and front wheels 2 is 75 Nm, whereas the torque delivered to the output shaft 34 and rear wheels 4 is 25 Nm. Thus, only one-fifth of the torque that is transferred through the indirect path passes through the clutch 38, so that the clutch 38 may be relatively small and compact.

Figure 6:
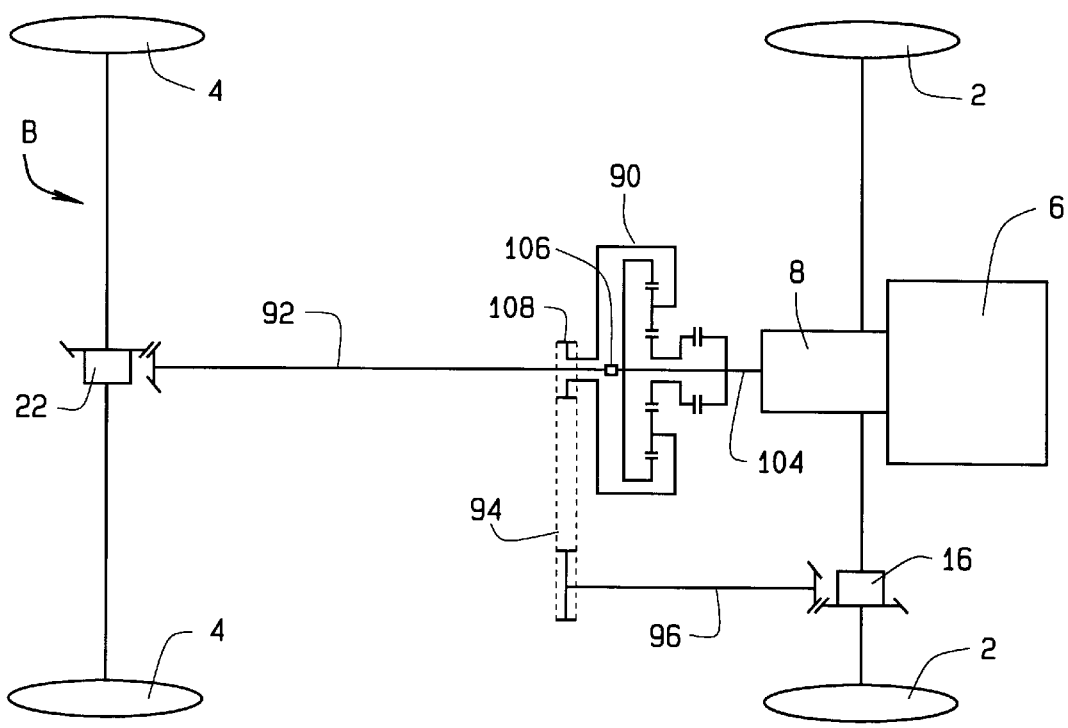
FIG. 6 is a schematic view of an automotive vehicle provided with a modified transfer case to accommodate a longitudinally mounted motor.

Another automotive vehicle B (FIG. 6) likewise has front and rear wheels 2 and 4 which are driven through front and rear differentials 16 and 22, respectively. Moreover, the vehicle B has a motor 6 and a transmission 8. However, the rear wheels 4 serve as the primary driving wheels and the front wheels 2 as the secondary driving wheels, and the motor 6 and transmission 8 are mounted longitudinally, not transversely as in the vehicle A. The transmission 8 delivers torque to a modified transfer case 90 which splits it between the rear wheels 4 and the front wheels 2. Indeed, after the split torque is delivered to the rear differential 22 through a drive shaft 92 which extends from the transfer case 90. The remainder of the torque is delivered to the front wheels 2 through a chain-and-sprocket drive 94 and a front drive shaft 96 which leads to the front differential 16.

Figure 7:
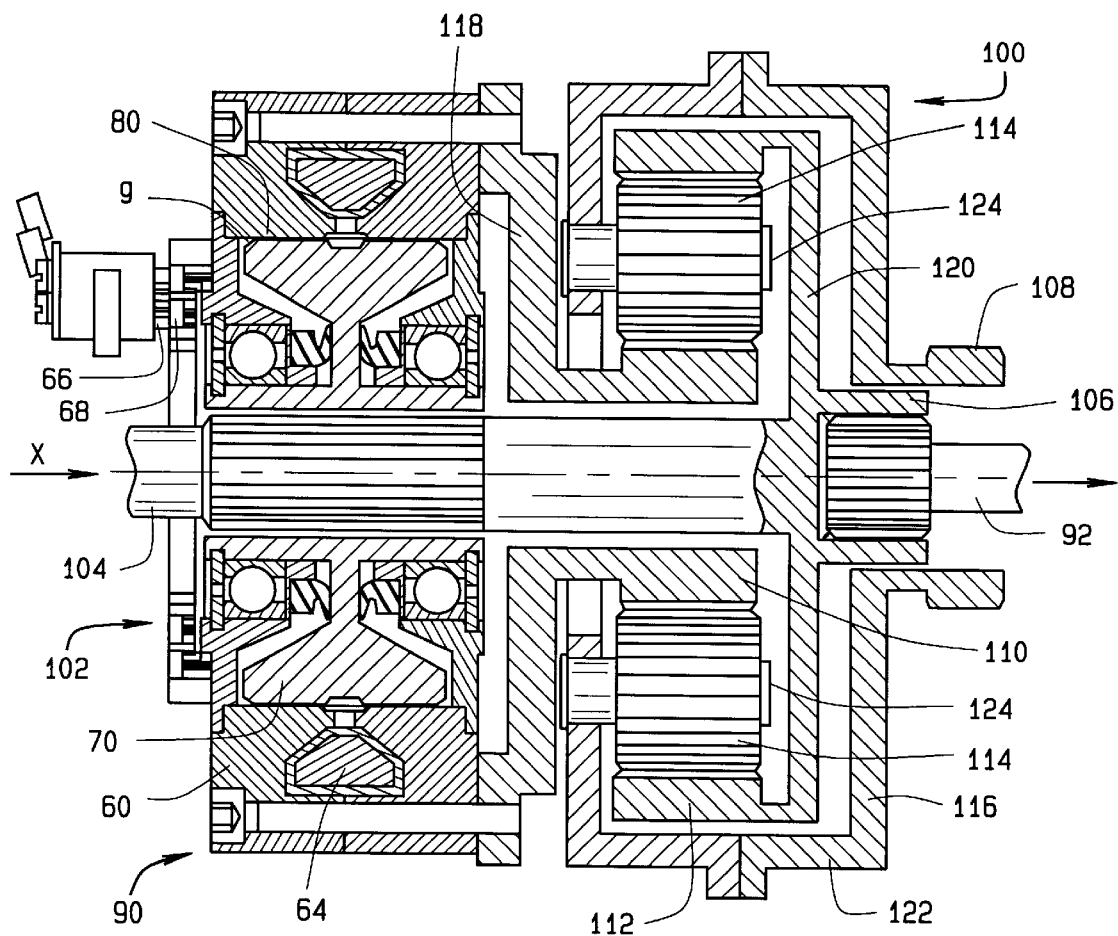
FIG. 7 is a longitudinal sectional view of the modified transfer case.
Figure 8:
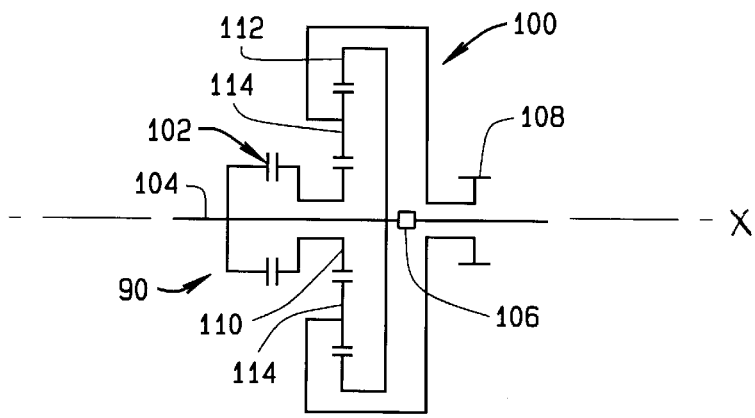
FIG. 8 is a kinematic diagram of the modified transfer case.

The transfer case 90, like the transfer case 12, has (FIG. 7) a planetary set 100 and a clutch 102 which are organized about an axis X and are otherwise quite similar to their counterparts in the transfer case 12. Also, the transfer case 90 has an input element in the form of an input shaft 104 and output element in the form of a splined coupler 106 and another output element in the form of sprocket 108. They too are organized about the axis X. The input shaft 104 is coupled to the transmission 8 so that all the torque delivered by the transmission 8 passes through into the input shaft 104. The coupler 106 lies at the end of the input shaft 104 and connects with drive shaft 92. The sprocket 108 encircles the coupler 106 and forms part of the chain-and-sprocket drive 94.

The magnetic particle clutch 102 is virtually the same as the clutch 38 and the reference numerals applied to the clutch 102 correspond to those applied to the clutch 38.

The planetary set 100 differs somewhat from the planetary set 36, but it does have a sun gear 110, a ring gear 112 located around the sun gear 112, planetary gears 114 engaged with the sun and ring gears 110 and 112, and a carrier 116 that follows the planet gears 114, it providing axes around which the planet gears 114 rotate.

The sun gear 110 of the planetary set 100 surrounds the input shaft 104, yet can rotate relative to the input shaft 104. It is coupled to the electromagnet 60 of the clutch 100 through a flange 118. Thus, the ring gear 112 and the electromagnet 60 rotate in unison. The ring gear 112 is coupled to the input shaft 104 and coupler 106 through another flange 120. The carrier 116 includes a split housing 122 which encloses the ring gear 112 and planet gears 114 and also spindles 124 which extend from the housing 122 into the planet gears 114 and provide axes about which the planet gears 114 rotate. The sprocket 108 is mounted on the split housing 122.

The input shaft 104 is coupled to the armature 70 of the clutch 102 through mating splines. It extends through the sun gear 110 where it is joined to the flange 120 and to the coupler 106.

Like the transfer case 12, the transfer case 90 has two paths, one a direct path and the other an indirect path which can accommodate slippage. Also, the indirect path has two segments, one a mechanical segment and the other a clutch segment.

In the operation of the vehicle B, the transfer case 100 delivers torque from the input shaft 104 directly to the drive shaft 92 at the coupler 106, this being the direct path. The drive shaft 92 thus rotates in unison with and always at the same velocity as the input shaft 104. The torque that is delivered to the output sprocket 108 passes through the mechanical segment and clutch segment of the indirect path, with most of it going through the mechanical segment. In that segment the torque passes from the input shaft 104 through the flange 120 to the ring gear 112, thence through the planet gears 114 to the carrier 116 to which sprocket 108 is attached. In the clutch segment torque transfers from the input shaft 104 to the armature 70 of the clutch 102, thence through the magnetic particles 80 in the gap g of the clutch 102 to the electromagnet 60 of the clutch 102. The torque flows from the electromagnet 60 to the sun gear 110 through the flange 118, and the sun gear 110 transfers it to the planet gears 114 where it recombines with the torque in the mechanical segment to be transferred through the split housing 122 to the sprocket 108. The input shaft 104 and coupler 106 could rotate at a slightly greater velocity than the sprocket 108. The same relationship between torque in the clutch segment of the indirect path and the torques in the direct and indirect paths applies, and that is the relationship demonstrated on Cartesian coordinates for a ratio of 4 in the planetary set 100 (FIG. 5).

Figure 9:
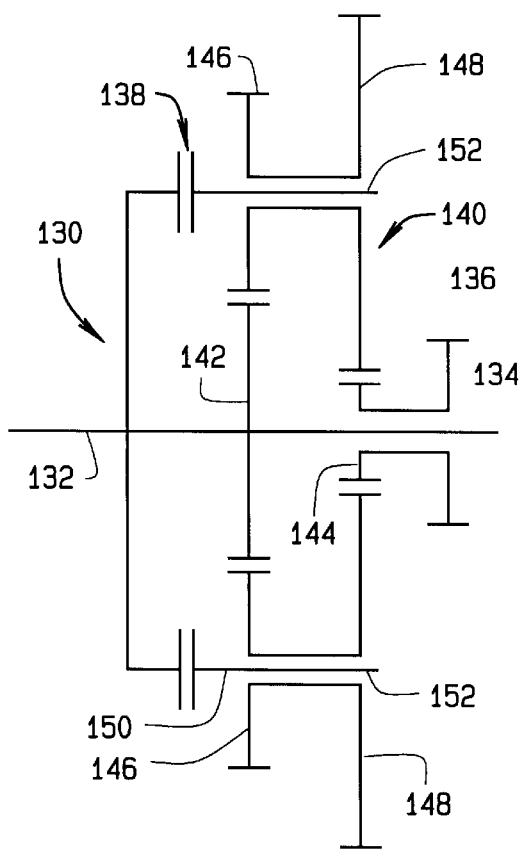
FIG. 9 is a kinematic diagram of still another modified transfer case.

Another modified transfer case 130 (FIG. 9) likewise has as single input element in the form of a shaft 132 and two output elements in the form of a shaft 134 and a sprocket 136. The input shaft 132 and output shaft 134 are united and rotate in unison of the same velocity. The transfer case 130 utilizes a clutch 138 that is virtually the same as the clutch 38, but relies on a planetary set 140 that operates on a kinematic principle somewhat different from the sets 36 and 100. Both are organized about the axis X as are the shafts 132 and 134 and the sprocket 136. The planetary set 140 includes two sun gears 142 and 144. While the two sun gears 142 and 144 rotate about the axis X, they are detached from each other, with the gear 142 being connected to the input shaft 132 and the gear 144 being connected to the output sprocket 136. The sun gears 142 and 144 mesh with planetary gears 146 and 148, respectively, and the planetary gears 146 and 148 are coupled to a carrier 150 having spindles 152. Indeed, the planetary gears 146 and 148 are organized in pairs, with each pair including a single planetary gear 146 and single planetary gear 148 located around a single spindle 152 of the carrier 150. The planetary gears 146 and 148 of a pair are joined together so that they rotate in unison and at the same angular velocity about their spindle 152. The carrier 150 is attached to the electromagnet 60 of the clutch 138, whereas the armature 70 of the clutch 138 is attached to the input shaft 132. The gears 142, 144, 146 and 148 and the carrier 150 all constitute elements of the planetary set 140.

In the operation of the transfer case 130 the torque applied at the input shaft 132 splits into a direct path and an indirect path, with the latter having a mechanical segment and a clutch segment. In the direct path the torque transfers directly from the input shaft 132 to the output shaft 134 since they are essentially the same. In the mechanical segment of the indirect path the torque passes from the sun gear 142 to the planet gears 146 and likewise to the planet gears 148 to which the gears 146 are joined, and thence to the other sun gear 144 and the output sprocket 136 to which it is connected. In the clutch segment, the torque passes from the input shaft 132 to the armature 70 of the magnetic particle clutch 138 and thence to the electromagnet 60 of the clutch 138. The electromagnet 60, being coupled to the planet gears 146 and 148 through the carrier 150, transfers torque in the indirect segment to the carrier 150 and planet gears 146 and 148, and here the torque combines with the torque from the mechanical segment and is transferred to the sun gear 144 and the output sprocket 136 attached to it.

The transfer case 12 may be used with the vehicle B and the transfer case 100 with the vehicle A. Moreover, the transfer case 130 may be used with either vehicles A or B, but is perhaps best suited for the vehicle B. Other variations are possible, and they may employ the same planetary sets 36, 100 or 140 with different hookups, or even different planetary sets. Irrespective of the hookups or planetary set, the arrangement should split the input torque into a direct or rigid pass-through path and an indirect path, with the indirect path having a mechanical segment and a clutch segment. The torques in the two segments of the indirect path should combine before an output element in that path. The planetary sets 36, 100 and 140 need not rely on gearing, but instead on friction surfaces, thus becoming traction drives, and indeed the word "gears" refer to traction drives as well. The electromagnets and armatures of the clutches 38, 102 and 138 need not be one within the other, but may be disposed axially with respect to each other. While magnetic clutches 38, 102 and 131 are preferred, other types of clutches will suffice. For example, a friction clutch, such as a wet plate clutch, will work as will an electromagnetic clutch or a hysteresis clutch. Indeed, any one of these alternative clutches may be smaller than clutches in conventional transfer cases by reason of the split in the indirect path between the mechanical segment and the clutch segment and the clutch being coupled with the low torque element of the planetary set.

What is claimed is:

1. A transfer case comprising:
    an input element;
    a first output element connected to the input element;
    a second output element;
    a clutch having first and second clutch members which are capable of rotating at different angular velocities, the clutch also including an electric coil located such that, when energized, it can magnetize particles located between the clutch members, the clutch having the capability of transferring torque between the clutch members when the members rotate at different angular velocities with the amount of torgue transferred being dependent on the current passing through the coil and independent of slippage between the clutch members, the first clutch member being connected to the input element; and
    a planetary gear set including first, second, third and fourth planetary elements organized about an axis, the first planetary element being connected to the second clutch member, the second planetary element being connected to the first clutch member, the third planetary element being connected to the second output element, and the fourth planetary element being located between first and third planetary elements.

2. A transfer case according to claim 1 wherein the clutch members rotate about the axis around which the planetary set is organized.

3. A transfer case according to claim 2 wherein the first planetary element is a sun gear, the second planetary element is a ring gear that surrounds the sun gear, the fourth planetary element is a planet gear that is located between and engages the sun and ring gears, and the third planetary element is a carrier that rotates about the axis and provides an axis about which the planet gear revolves.

4. A transfer case according to claim 3 wherein the first and second clutch members are concentric, and the first clutch member surrounds the second clutch member.

5. A transfer case according to claim 3 wherein the clutch members are concentric, and the second clutch member surrounds the first clutch member.

6. A transfer case according to claim 2 wherein the second planetary element is a sun gear, the third planetary element is another sun gear; the fourth planetary element is joined-together planet gears engaged with the two sun gears, and the first planetary element is a carrier that rotates about the axis and provides an axis about which the joined-together planet gears rotate.

7. A transfer case according to claim 2 wherein the output and input elements rotate about the axis, and one of the output elements surround the other output element.

8. A transfer case according to claim 2 wherein one of the clutch members is connected to a sun gear, which is the first member of the planetary set, such that the clutch member and the sun gear always rotate in unison and at the same velocity.

9. A transfer case comprising: an input element, first and second output elements, a magnetic particle clutch having an electrical coil and a planetary set all connected together such that a direct path exists through which torque is transferred between the input element and the first output element without variation in angular velocity between the input element and first output element and such that an indirect path exists through which torque passes from the input element to the second output element with the amount of torque transferred through the indirect path being dependent on the current passing through the electric coil of the clutch.

10. A transfer case according to claim 9 wherein the indirect path includes a mechanical segment in which torque passes from the input element to the second output element through only the planetary set and a clutch segment in which torque passes from the input element to the second output element through both the clutch and planetary set.

11. A transfer case according to claim 10 wherein the planetary set includes a sun gear, a ring gear surrounding the sun gear, a planet gear located between and engaged with sun and ring gears, and a carrier providing an axis about which the planet gear rotates; and wherein the torque that passes through the clutch segment of the indirect path is transferred through the sun gear.

12. A transfer case comprising:

an input element;

a first output element;

second output element;

a magnetic particle clutch having first and second clutch members arranged along an axis; and a planetary set organized about the same axis and including a sun gear connected to the first clutch member, a ring gear connected to the second clutch member and to the input element, planet gears located between and engaged with the sun and ring gears, and a carrier providing axes about which the planet gears rotate and being connected to the second output element.

13. A transfer case according to claim 12 wherein the second clutch member surrounds the first clutch member; wherein the input and output elements rotate about the axis; and wherein the first output element surrounds the second output element.

14. A transfer case according to claim 12 wherein the first clutch member surrounds the second clutch member; wherein the input and output elements rotate about the axis; and wherein the second output element surrounds the first output element.

15. In an automobile having primary and secondary driving wheels and a power unit for delivering torque, a transfer case for distributing the torque delivered by the power unit to the primary and secondary driving wheels, said transfer case comprising:

an input element connected to the power unit;

a first output element connected to the input element and to the primary driving wheels;

a second output element connected to the secondary driving wheels;

a magnetic particle clutch having first and second clutch members which are capable of rotating at different angular velocities, the clutch having the capability of transferring torque between the clutch members, the first clutch member being connected to the input element; and a planetary gear set including first, second, third and fourth planetary elements organized about an axis, the first planetary element being connected to the second clutch member, the second planetary element being connected to the input element, the third planetary element being connected to the second output element, and the fourth planetary element being located between first and third planetary elements.

16. A transfer case according to claim 10 wherein the torque transferred through the mechanical segment of the indirect path is greater than the torque transferred through the clutch segment.

17. A transfer case comprising:

an input end element;

a first output end element connected to the input end element such that the input end element and the first output end element rotate together without slippage to create a direct path for transferring torque through the transfer case;

a second output end element connected to the input end element such that the two can rotate together with slippage to create an indirect path through the transfer case; the indirect path including:

a magnetic particle clutch having first and second clutch members which are capable of rotating at different angular velocities, and an electric coil, the clutch having the capability of transferring torque between the clutch members when the members rotate at different angular velocities, with the amount of torque transferred being dependent on the current passing through the coil, the first clutch member being connected to one of the end elements in the indirect path;

a planetary gear set including first, second, third and fourth planetary element organized about an axis, the first planetary element being connected to the second clutch member, the second planetary element being connected to the first clutch member, the third planetary element being connected to the other end element in the indirect path; and the fourth planetary element being located between first and third planetary elements.

18. A transfer case according to claim 17 wherein the amount of torque transferred through the clutch represents only a small amount of the torque transferred through the indirect path.

19. A transfer case according to claim 18 wherein the clutch members rotate about the axis around which the planetary set is organized; and wherein the first planetary element is a sun gear, the second planetary element is a ring gear that surrounds the sun gear, the fourth planetary element is a planet gear that is located between and engages the sun and ring gears, and the third planetary element is a carrier that rotates about the axis and provides an axis about which the planet gear revolves.

* * * * *